No. 849,705. PATENTED APR. 9, 1907.
W. A. TURBAYNE.
SYSTEM OF ELECTRICAL DISTRIBUTION AND REGULATION.
APPLICATION FILED SEPT. 15, 1904.
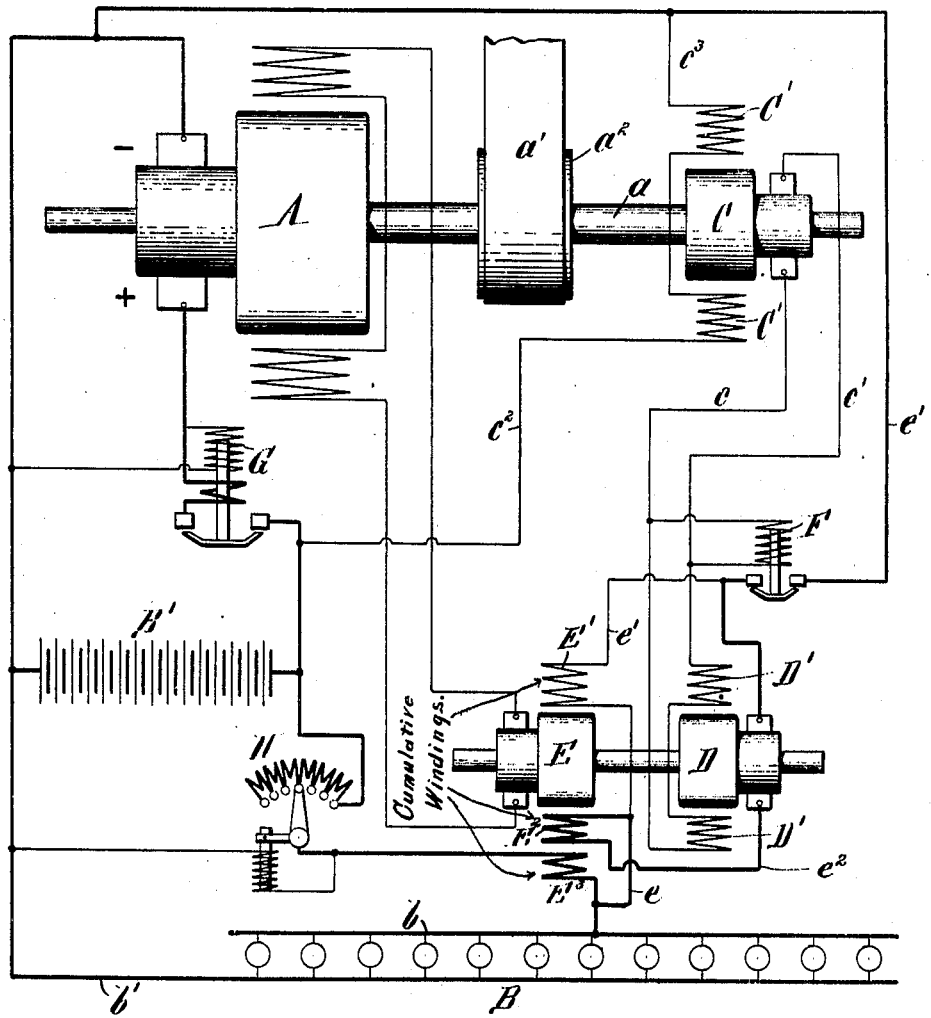
Witnesses:
E. A. Volk.
R. W. Reimer.
Inventor.
Wm. A. Turbayne,
by Wilhelm, Parker & Hard
Attorneys.

UNITED STATES PATENT OFFICE.

WILLIAM A. TURBAYNE, OF LANCASTER, NEW YORK, ASSIGNOR TO GOULD COUPLER COMPANY, OF NEW YORK, N. Y.

SYSTEM OF ELECTRICAL DISTRIBUTION AND REGULATION.

No. 849,705.     Specification of Letters Patent.     Patented April 9, 1907.

Application filed September 15, 1904. Serial No. 224,505.

*To all whom it may concern:*

Be it known that I, WILLIAM A. TURBAYNE, a citizen of the United States, residing at Lancaster, in the county of Erie and State of New York, have invented a new and useful Improvement in Systems of Electrical Distribution and Regulation, of which the following is a specification.

This invention relates to electric-lighting systems in which the generating-dynamo is subject to wide variations of speed and is liable to have its direction of rotation reversed—as, for instance, in railway-car lighting systems in which the dynamo is driven from one of the car-axles.

My application for United States Letters Patent, Serial No. 213,983, filed June 24, 1904, discloses such a system, which is provided with automatic regulating means for generating a substantially constant current irrespective of the speed with which the dynamo-armature is driven and for delivering the current always in the same direction in whatever direction the armature of the dynamo may be rotated. In the system described in my said application the field-magnet of the main or generating dynamo is excited by an exciter-dynamo, which is driven with a variable speed, increasing upon a decrease of speed of the generator-dynamo and decreasing upon an increase of speed of the generator-dynamo, by a motor whose field-magnet is energized from an auxiliary dynamo the armature of which is subject to the same changes in speed and direction of rotation as the armature of the generating-dynamo. A storage battery is employed in this system and is charged from the main generator and supplies current to the work-circuit when the car is not in motion or is running so slowly that the generator does not produce the desired voltage. In this system, as fully explained in my said application, it is possible by the use of small and light machines to maintain a practically constant output of the main generator under a very wide range of speed variations thereof, and the generator output is also automatically varied in an inverse sense to the changes of electromotive force of the battery due to charging and discharging.

The object of the present invention is to provide such systems with means whereby, in addition to the regulation of the generator output against speed changes of the main generator and in accordance with the needs of the battery, the generator excitation and consequently its output are also increased or decreased as lamp or other load is added to or removed from the work-circuit.

The accompanying drawing illustrates diagrammatically an electrical system of distribution embodying the invention as applied, for example, to a railroad-car lighting system.

A represents the main generator the armature of which is driven at varying speeds and may at times be driven in opposite directions, as is the case when the generator is driven from a car-axle.

B represents the incandescent lamps or other translating devices connected across the work-circuit $b$ $b'$, and B' the storage battery connected across the generator-circuit.

C represents the auxiliary dynamo, whose armature is subject to the same variations in speed and direction as that of the main generator. This auxiliary dynamo may have its armature mounted on the same shaft $a$ upon which the armature of the main generator is mounted and which is rotated from the car-axle by a belt $a'$ and pulley $a^2$, or other suitable means.

D represents the motor, and E the exciter-dynamo whose armature is driven by the motor and which excites the field-magnet of the main generator. The field-windings D' of the motor D are connected across the brushes of the auxiliary dynamo C by conductors $c$ $c'$ and are energized by the current produced by said dynamo. The field-windings C' of the auxiliary dynamo C are preferably fed directly from the battery, as by conductors $c^2$ $c^3$, and are subject to the variable voltage of the battery as determined by its condition of charge, or they may be fed from a constant source.

The field-magnet of the exciter-dynamo E has a winding E', which is connected in shunt across the work-circuit, as by conductors $e$ $e'$, and a second winding $E^2$, which acts cumulatively with the other winding E' and is connected in series with the armature of the motor D across the work-circuit, as by the conductors $e$ $e^2$ $e'$. These field-windings of the exciter-dynamo and the armature of the motor can be connected to any other practically constant source, and the field-windings of the auxiliary dynamo may connect with other sources of constant or variable voltage with like results.

F represents the automatic switch for connecting the armature of the motor and the field-winding $E^2$ of the exciter-dynamo, which is connected with the motor-armature in circuit when the train and the main generator attain a predetermined speed.

G represents the automatic switch for similarly connecting the main generator into the battery and work circuit when a predetermined electromotive force across the main generator is produced.

H represents any suitable automatic means for maintaining a constant electromotive force across the work-circuit.

The exciter-dynamo will revolve at the maximum speed with the maximum field excitation and will excite the field-magnet of the main generator to its maximum value at the slowest speed of the generator for which the system is adjusted, which results in the main generator furnishing its full output at such low train speed. To make possible the use of a comparatively light generator, it is essential that the magnetic circuits thereof be worked at high magnetic densities at low speeds, which densities of course will decrease as the speed rises, and in order to compensate for these variations in density of the iron the field excitation of the generator is decreased in greater proportion than the speed increase thereof, while decrease of speed will be accompanied by an increase in excitation in greater ratio than such speed decrease. The rise and fall of the battery electromotive force accompanying the charging and discharging processes will cause a corresponding rise and fall of electromotive force across the brushes of the auxiliary dynamo, which rise and fall, like the rise and fall due to speed increase and decrease, will act through the exciter apparatus to cut down or increase the excitation of the main generator, and therefore cause a variation of the output of the latter in greater proportion than the increase or decrease of the battery-voltage.

In addition to the field-windings $E'$ and $E^2$ of the exciter-dynamo, which are disclosed in my said application, the field-magnet of said exciter-dynamo is provided with a coarse-wire winding $E^3$ in series with the work-circuit, which acts cumulatively with the other two windings $E'$ $E^2$. When the lamps or other translating devices are cut out and the work-circuit is idle, the series winding $E^3$ has no effect upon the exciter apparatus, and this winding also has a minimum effect when the generator is running at a slow speed. When the lamps are cut in, the current passes through and energizes the series coil $E^3$, and the effect of the latter on the field-magnet of the exciter-dynamo varies proportionately to the strength of the current in the work-circuit as determined by the number of lamps added thereto. The series winding $E^3$ acts to increase the field excitation and output of the main generator when load is added to the work-circuit, as by lighting the lamps, and acts likewise to decrease the output of the main generator when load is taken off of the work-circuit, as by cutting out the lamps, so that in addition to and irrespective of the regulation provided for in the system described in my former application the present system operates to regulate the output of the main generator according to the needs of the work-circuit as determined by the amount of work which the latter is called on to perform.

While the improvement is described and shown in this application in connection with a system in which the field-magnet of the exciter-dynamo has the two other windings $E'$ and $E^2$, it will be understood that the series winding $E^3$ is also applicable to a system such as shown in my United States Letters Patent No. 757,695, granted April 19, 1904, in which the field-magnet of the exciter-dynamo is not provided with the winding $E^2$ in series with the motor-armature.

I claim as my invention—

1. The combination of a main generator, and an exciter apparatus therefor whose electromotive force varies in an inverse sense to but in greater proportion than the changes in speed of the main generator and also in a direct sense to changes in load on the work-circuit, substantially as set forth.

2. The combination of a main generator, an exciter apparatus therefor, a work-circuit, and means for changing the electromotive force of the exciter apparatus inversely with but in greater proportion than the speed changes of the main generator and in proportion to changes in the load on said work-circuit, substantially as set forth.

3. The combination of a main generator, an exciter apparatus therefor, a storage battery connected with the main generator, a work-circuit, and means for varying the electromotive force of the exciter apparatus in an inverse sense to changes in the electromotive force of the battery and in a direct sense to changes in the load on the work-circuit, substantially as set forth.

4. The combination of a main generator, an exciter apparatus therefor, a storage battery connected with the main generator, a work-circuit, and means for varying the electromotive force of the exciter apparatus in an inverse sense to changes in the speed of the generator and in the electromotive force of the battery and in a direct sense to changes in the load on the work-circuit, substantially as set forth.

5. The combination of a main generator, a work-circuit, an exciter-dynamo for said generator having a field-winding for changing the electromotive force of the exciter-dynamo in direct relation to changes in load on the work-circuit, and means for changing the electromotive force of the exciter-dynamo in an inverse sense to changes in speed of the main generator, substantially as set forth.

6. The combination of a main generator, a work-circuit, an exciter-dynamo for said generator having a field-winding in series with said work-circuit for changing the electromotive force of the exciter-dynamo in direct relation to changes in load on the work-circuit, and means for changing the electromotive force of the exciter-dynamo in an inverse sense to changes in speed of the main generator, substantially as set forth.

7. The combination of a main generator, a work-circuit, a motor, and an exciter-dynamo for said generator, which dynamo is driven by said motor and which is provided with a field-winding in series with the work-circuit, and with another field-winding in series with the armature of said motor, substantially as set forth.

8. The combination of a main generator, a work-circuit, a motor, and an exciter-dynamo for said generator, which dynamo is driven by said motor and which is provided with a field-winding in series with the work-circuit, a field-winding in series with the armature of said motor, and a field-winding in shunt across the work-circuit, substantially as set forth.

Witness my hand this 8th day of September, 1904.

WILLIAM A. TURBAYNE.

Witnesses:
CHAS. W. PARKER,
EDWARD C. HARD.